United States Patent
Gregg et al.

(10) Patent No.: US 9,048,674 B2
(45) Date of Patent: Jun. 2, 2015

(54) SYSTEM AND METHOD FOR CHARGE NOTICE OR CHARGE MODE IN A VEHICLE

(71) Applicant: Toyota Motor Engineering & Manufacturing North America, Inc., Erlanger, KY (US)

(72) Inventors: Christopher Gregg, Gardena, CA (US); Hisanori Ito, Gardena, CA (US); Hidetoshi Kusumi, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 384 days.

(21) Appl. No.: 13/631,918

(22) Filed: Sep. 29, 2012

(65) Prior Publication Data

US 2013/0271076 A1    Oct. 17, 2013

Related U.S. Application Data (60) Provisional application No. 61/624,011, filed on Apr. 13, 2012.

(51) Int. Cl.
*H02J 7/00*     (2006.01)
*H02J 7/04*     (2006.01)
*B60L 11/18*    (2006.01)

(52) U.S. Cl.
CPC ............... *H02J 7/0047* (2013.01); *H02J 7/041* (2013.01); *B60L 11/1838* (2013.01); *Y02T 10/7005* (2013.01); *Y02T 90/163* (2013.01); *Y02T 90/168* (2013.01); *Y02T 90/14* (2013.01); *Y02T 90/128* (2013.01); *Y04S 30/12* (2013.01); *Y02T 90/121* (2013.01)

(58) Field of Classification Search
CPC ... Y02T 10/7088; Y02T 90/14; Y02T 90/163; Y02T 90/16; Y02T 90/12; Y02T 90/125; Y02T 90/168; H02J 7/0027; H02J 17/00; H02J 7/0004; H02J 7/0031; H02J 7/0036; B60L 11/1816; B60L 11/1838; Y04S 30/12; H01H 35/00
USPC .................................................. 320/107, 109
See application file for complete search history.

(56) References Cited

U.S. PATENT DOCUMENTS

| | | |
|---|---|---|
| 5,327,066 A * | 7/1994 | Smith ........................... 320/109 |
| 5,349,535 A | 9/1994 | Gupta |
| 7,986,126 B1 | 7/2011 | Bucci et al. |
| 8,055,403 B2 | 11/2011 | Lowrey et al. |
| 2010/0013434 A1 | 1/2010 | Taylor-Haw et al. |
| 2010/0185357 A1 | 7/2010 | Mizumachi |

(Continued)

*Primary Examiner* — Sun Lin
(74) *Attorney, Agent, or Firm* — Snell & Wilmer LLP (57) ABSTRACT

A charge notification system or user-selectable charge configuration for a vehicle. The system includes a battery, a charging connector, a charging cable, a charge location, a processor and a memory. The processor of the vehicle determines, based upon logic steps or parameters stored in the memory, when to send messages to a remote device based upon a charging characteristic of the vehicle. Different messages may be generated by the processor and transmitted for different charging characteristics of the vehicle. The charge notification system may also include an indicator local to the vehicle and configured to illuminate in varying configurations or at varying frequencies based upon a state of charge of the battery. A user may select between charging modes for the vehicle in order to extend a useable life of the battery by allowing the battery to charge up to predetermined or modifiable battery charge levels.

20 Claims, 5 Drawing Sheets

(56) References Cited

U.S. PATENT DOCUMENTS

| | | |
|---|---|---|
| 2010/0207588 A1 | 8/2010 | Lowenthal et al. |
| 2010/0301810 A1 | 12/2010 | Biondo et al. |
| 2010/0315197 A1 | 12/2010 | Solomon et al. |
| 2011/0066309 A1 | 3/2011 | Matsuoka et al. |
| 2011/0106329 A1 | 5/2011 | Donnelly et al. |
| 2011/0140656 A1 | 6/2011 | Starr et al. |
| 2011/0191265 A1 | 8/2011 | Lowenthal et al. |
| 2011/0213656 A1 | 9/2011 | Turner |
| 2011/0227531 A1 | 9/2011 | Rajakaruna |
| 2013/0099740 A1* | 4/2013 | Takashima et al. ........... 320/109 |
| 2013/0099742 A1* | 4/2013 | Takashima et al. ........... 320/109 |

* cited by examiner

SYSTEM AND METHOD FOR CHARGE NOTICE OR CHARGE MODE IN A VEHICLE

CROSS REFERENCE TO RELATED APPLICATIONS

This application claims the benefit and priority of U.S. Provisional Application No. 61/624,011, filed on Apr. 13, 2012, the entire contents of which are hereby incorporated by reference herein.

BACKGROUND

1. Field

The present invention relates generally to vehicle charging systems and improvements thereof. More particularly, the present invention relates to a battery charging system and method for an automobile or other vehicle utilizing notification messages or indicators and improvements thereof.

2. Description of the Related Art

As automobiles and other vehicles begin incorporating alternative fuel or energy sources, such as rechargeable batteries, for powering the drivetrain, consumers face a changing and new set of requirements for ensuring appropriate power or energy levels in utilization of those vehicles. Instead of traveling to a gas station or pump every couple of weeks, users of such alternative fuel source vehicles are now often required to recharge electric batteries or electrical storage components of the vehicles on a daily basis. Indeed, depending upon the distances traveled by users during their daily activities, multiple recharges of the vehicle battery or batteries may be necessary within a 24 hour period. While these vehicle aid in reducing the negative economic impact from automobiles having only internal combustion engines, users must adjust to this new method of vehicle maintenance to ensure uninterrupted use of their vehicle.

Unfortunately, a variety of issues have arisen as a consequence of this vehicle battery recharging capability. While fuel gauges or other indicators within the vehicle indicating low energy levels when the vehicle is powered may help notify a user that a battery recharge is required in the near or imminent future, such alerts do nothing to inform the user after the vehicle has been disabled or left in a parking spot or garage. Indeed, it is at the times when the user is no longer in or near the vehicle that information about the charging characteristics of the vehicle would be of particular use since most of the battery recharging for the vehicle occurs during periods of non-use of the vehicle. Moreover, as newer technologies are increasingly incorporated into the vehicles with improved or more efficient recharging or energy storage capabilities, users of the vehicles unfamiliar with such technology would benefit from additional information or guidance regarding the proper connection or setup of the vehicle for charging purposes.

Thus, there is a need for a notification system and method for a vehicle that overcomes the above drawbacks.

SUMMARY

A notification system or method would interface with the battery and/or electrical connections or system of a vehicle and be configured to notify or otherwise alert an owner or user of the vehicle of the charging characteristics of the vehicle. The notification system or method would allow for notification even if a user is not physically present at the vehicle incorporating the system and be capable of tailoring the notification to better inform the user of particular characteristics of the vehicle. The notification system or method would also be inexpensive to manufacture and integrate with other systems or components of the vehicle in order to provide more accurate or in-depth information to the user. The notification system or method would be modifiable or tunable by the user such that optimum or desired charging characteristics for the vehicle may be obtained depending upon user preferences.

A system or method for charging a vehicle and utilizing notification messages to a user of the vehicle is described. In one embodiment, a charging notification system for a vehicle may include a battery and a conductor coupled with the battery and configured to receive power for charging the battery when the conductor is electrically connected with a charging cable. A processor is coupled with the battery and configured to generate a signal if the battery is not charging when the conductor is electrically connected with the charging cable. An antenna is coupled with the processor and configured to wirelessly transmit the signal to a remote device.

In another embodiment, a method for notifying a user of a vehicle, via a processor of the vehicle, a charging characteristic of the vehicle, may include the steps of delaying, using the processor, for a predetermined amount of time, determining, using the processor, if a charging cable is electrically connected to the vehicle, generating, using the processor, a first message if the charging cable is not electrically connected to the vehicle, determining, using the processor, if the charging cable is electrically connected to a charge location for receiving power from the charge location, generating, using the processor, a second message if the charging cable is electrically connected to the vehicle but is not electrically connected to the charge location, determining, using the processor, if a battery of the vehicle is charging, and generating, using the processor, a third message if the charging cable is electrically connected to the vehicle and to the charge location but the battery of the vehicle is not charging.

In still another embodiment, a method for notifying a user of a vehicle, via a processor of the vehicle, a charging characteristic of the vehicle, may include the steps of waiting, using the processor, for a predetermined period of time, determining, using the processor, if a charging cable is electrically connected between a battery of the vehicle and a charge location, sending, using the processor, a first message to a remote device if the charging cable is not electrically connected between the battery of the vehicle and the charge location, determining, using the processor, if the charge location is a recognized location in a memory electrically connected with the processor, and sending, using the processor, a second message to the remote device if the charge location is not a recognized location.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
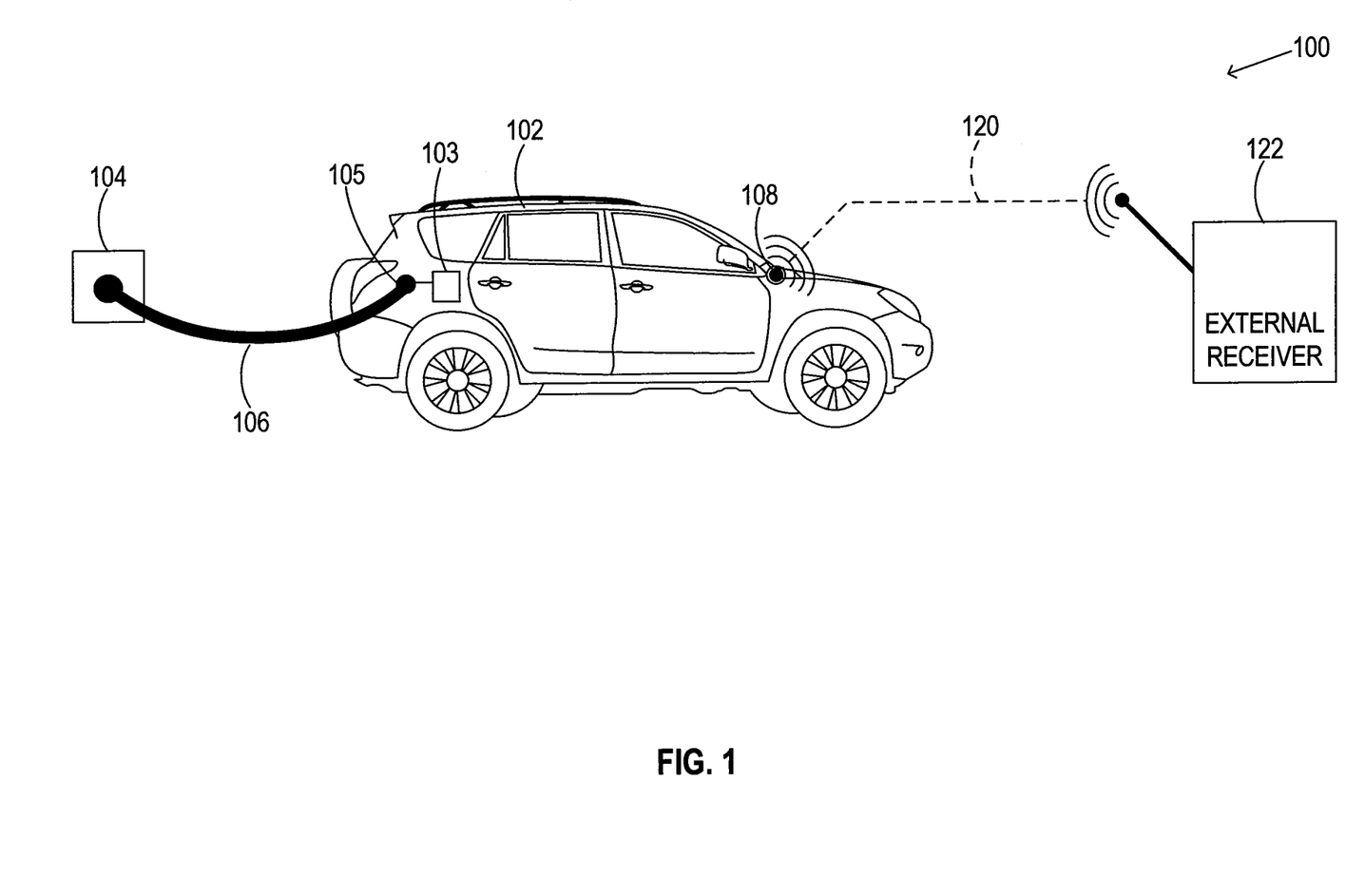
FIG. 1 is a system diagram of a charge notice system for a vehicle according to an embodiment of the present invention.

Referring to FIG. 1, a charge notice system 100 for a vehicle 102 is shown. The vehicle 102 includes a charging connector or other conductor 105 for electrically connecting the vehicle 102 to a charging device or location 104 in order to recharge an electric battery 103 of the vehicle 102. A charging cable 106 extends between the charging connector 105 of the vehicle 102 and the desired charging device or location 104. Thus, when the vehicle 102 is not being driven (e.g., is parked in a user's garage or at a parking spot with compatible charging capabilities), the user may plug the vehicle 102 into the charging device or location 104 in order to replenish the state of charge of the electric battery or batteries 103.

A processor 108 is also coupled with and located inside the vehicle 102 and is configured to generate a signal 120 for wireless transmission (e.g., using an antenna coupled with the processor 108) to an external receiver or transceiver 122. The processor 108 may be electrically connected (i.e., wired or wirelessly) with the battery 103 and/or the charging connector 105 of the vehicle 102. The external receiver 122 may be a satellite, cell phone, pager, laptop or desktop computer, or any other type of electronic device capable of receiving and/ or transmitting communications or signals from and to the processor 108 of the vehicle 102 (e.g., using a satellite network, a cellular network, the Internet, etc.). The processor 108 is configured to or is coupled with other components configured to wirelessly transmit a signal or a message 120 (e.g., a text SMS message, automated voicemail message, email message, etc.) to the external receiver 122 based upon charging characteristics of the battery 103 or the connection of the charging cable 106 to the charging connector 105 or the charging device or location 104. A phone number, email address, or other destination location, address or information for use in wirelessly transmitting the signal or the message 120 from the processor 108 may be stored in a memory of or interfacing with the processor 108. In one embodiment, the processor 108 may be located in a dash of the vehicle 102.

In one embodiment, the charge notice system 100 may operate to wirelessly transmit the message 120 from the processor 108 to the external receiver 122 if the charging cable 106 is appropriately connected between the charging connector 105 of the vehicle 102 and the charging device or location 104, but the battery 103 of the vehicle 102 is not being charged. This may be due to a malfunction of electronics within the vehicle 102, a power outage at the charging device or location 104 or may be due to a connection or conductor problem in the charging cable 106 itself or its connections with the charging connector 105 or the charging location 104. In another embodiment, the charge notice system 100 may operate to wirelessly transmit a message 120 from the processor 108 to the external receiver 122 if the charging cable 106 is connecting the charging connector 105 of the vehicle 102 to an unknown or unrecognized charging location 104 (e.g., a charging location at geographic coordinates not previously recognized or stored in a memory of the vehicle 102 or outside of a predefined range or radius of a stored home address or location for the vehicle 102). Such functionality may help improve recovery of stolen vehicles by immediately alerting an owner that an attempt to charge the vehicle 102 at an unrecognized location has occurred. In some embodiments, the geographic coordinates or other identifying information corresponding to the charging location 104 may be transmitted to the external receiver 122 in the message 120 wirelessly transmitted from the processor 108.

In still another embodiment, the charge notice system 100 may operate to wirelessly transmit the message 120 from the processor 108 to the external receiver 122 if the user of the vehicle 102 has improperly connected the charging cable 106 to either the charging connector 105 of the vehicle 102 or the charging location 104. This may occur, for example, if the user fails to fully mate the charging connector 105 or the charging location 104 with the charging cable 106. This may also be determined, for example, if the vehicle 102 includes a timing system or device configured to automatically begin charging of the vehicle 102 at a known or stored charging location 104 after a certain period of time upon shutting down the vehicle 102. If the timing system or device attempts to initiate charging, but fails due to missing or inadequate electrical connection, the processor 108 may initiate wireless transmission of the message 120 to the external receiver 122.

The signal or message 120 transmitted by the processor 108 may be modified or configured in order to more specifically alert the user to the precise charging error encountered. For example, if the charging cable 106 is not plugged in properly, the message 120 may explicitly state (e.g., in a body of a text message, email, pre-recorded or digitized voice message, etc.) the charging cable is incorrectly mated with either the charging connector 105 or the charging device or location 104. If the charging cable 106 is properly connected but the battery 103 of the vehicle 102 is not charging, the message 120 may instead state that a different electrical issue is interrupting charging of the vehicle 102, that the battery 103 has reached its maximum charge capacity or that the battery 103 is unable to be charged. Moreover, if the message 120 is sent due to an unknown or previously unrecognized charging location 104, the message 120 may state that the vehicle is being charged at an unknown charging location 104 and include information (e.g., geographic) about the unknown or unrecognized charging location 104. These different messages may be predetermined or predefined in memory or they may be determined or created in real-time based upon one or more inputs to the processor 108.

The signal or message. 120 generated by the processor 108 and transmitted may be delayed by a predetermined amount of time after the vehicle 102 is shut off (e.g., 10 minutes) in order to avoid sending nuisance messages to the user and to provide the user of the vehicle 102 a window of time to plug-in the vehicle 102 for charging purposes. In addition, in certain embodiments, the processor 108 or components connected with the processor 108 may be configured to receive signals or messages back from the external receiver 122 or another remote device, such that the user may respond to a notification message and modify one or more aspects or parameters of the vehicle 102 (e.g., prevent the battery 103 from charging, request a subsequent reminder message, disable the vehicle 102, etc.). Different types of messages may be defined to be transmitted to different destination locations or addresses. Similarly, messages may be routed to different destination locations or addresses based on other characteristics of the vehicle or its operation (e.g., a message may be routed to a stored phone number corresponding to a user who most recently operated or was within the cabin of the vehicle).

Figure 2A:
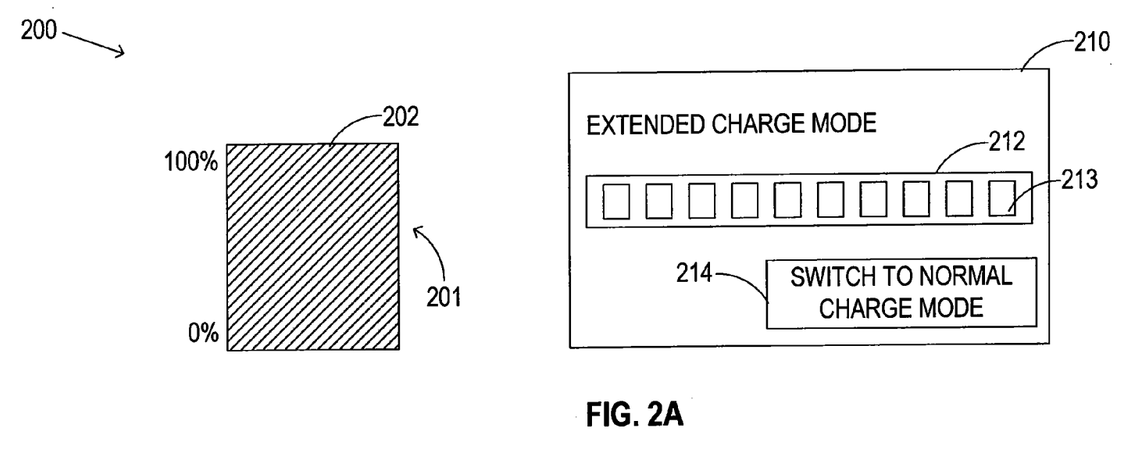
FIG. 2A is a display screen of a vehicle charging system showing an extended charging mode according to an embodiment of the present invention.

In FIG. 2A, a charge mode system 200 for a vehicle is shown and includes a display screen 210 operating in an extended charging mode. The charge mode system 200 may incorporate certain structural or functional features that are the same as or similar to the charge notice system 100 of FIG. 1. The charge mode system 200 includes features for switchably changing between charging modes for a battery 201 of the vehicle since electric batteries used in automotive applications may have optimal charging characteristics that extend the operational life of the battery. For example, certain electric batteries may have a longer operational life if the battery is charged only up to a first threshold (e.g., 80%) of the battery maximum capacity. The charge mode system 200 allows a user of the vehicle to choose a charge configuration for the battery for allowing such increased operational life at the expense of maximum charge capacity or vice versa. The user may interface with the charge mode system 200 from within the vehicle (e.g., utilizing a display located in a dash of the vehicle) or may interface with the charge mode system 200 remotely (e.g., using a device with an external receiver and/or transmitter capable of wireless communication with a processor of the vehicle, the same as or similar to the previous discussion for FIG. 1.

The vehicle may include a display in the cabin or passenger area (e.g., in a dash of the vehicle). The display of the vehicle may illuminate or otherwise make visible a display screen 210 upon charging of the battery, for example, when the vehicle has been turned off and initially connected to a charging location via a charging cable. The display screen 210 may replaceably or additionally be displayed on a remote device, such as a cell phone, tablet or smart phone or other component remote from the vehicle. When the charge mode system 200 is operating in the extended charging mode, the battery 201 is permitted to fully charge 202 up to 100% of its maximum charge capacity. As the battery 201 charges, the display screen 210 subsequently lights up elements 213 on an indicator bar 212. For example, the indicator bar 212 may have a total of 10 possible elements 213, each element 213 corresponding to 10% of battery charge. Thus, when the battery 201 is at full charge 202, 10 elements 213 are illuminated on the indicator bar 212. In an alternative embodiment, different (e.g., non-equal) percentage values for battery charge may be used for determining the illumination of the elements 213 on the indicator bar 212. For example, certain of the left (low charge) and/or right (high charge) elements 213 may be indicative of a greater percentage of battery charge than elements 213 positioned in the middle or center of the indicator bar 212. An alternative embodiment may utilize different visual notifiers in place of or in addition to the indicator bar 212 and/or the elements 213 for visually communicating the current state of battery charge.

Figure 2B:
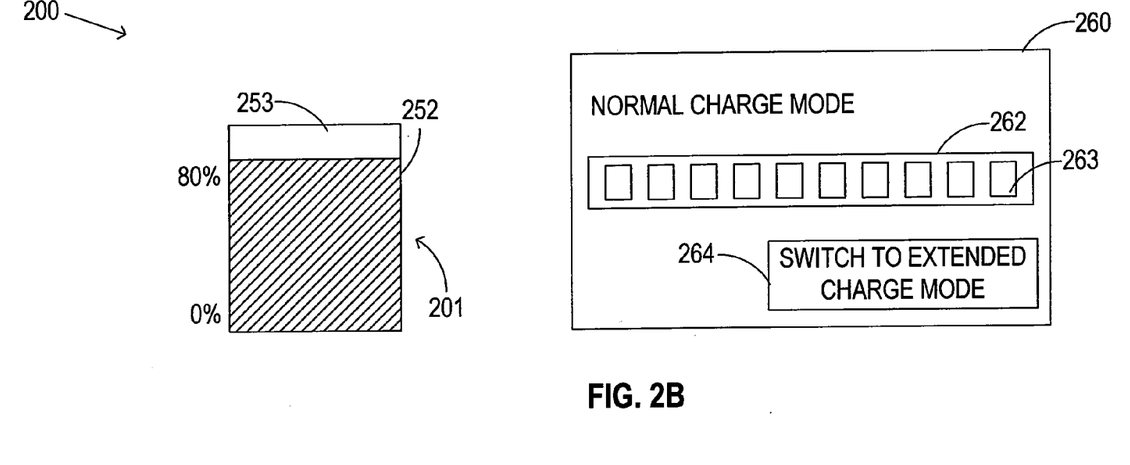
FIG. 2B is a display screen of the vehicle charging system of FIG. 2A showing a normal charging mode according to an embodiment of the present invention.

The display screen 210 also includes a user-interface element 214 for allowing a user to switch to a normal charging mode for improving the operational life of the battery 201, as discussed in greater detail for FIG. 2B. In an alternative embodiment, any of a variety of user control elements may be utilized (e.g., a button, a knob, a switch, a touch sensor, a microphone interfacing with voice recognition software, etc.) for allowing the user to choose or select the desired charging mode for the vehicle. The desired charging mode may also be set remotely (e.g., using an external transmitter capable of communicating with the processor of the vehicle, the same or similar as previously discussed).

In FIG. 2B, the charge mode system 200 is shown with a display screen 260 operating in a normal charging mode. In normal charging mode, the battery 201 is only permitted to charge a first portion 252 up to a threshold or predetermined level or percentage (e.g., between 80% and 90%) of the maximum charge capacity. The remaining portion 253 of the battery does not get recharged in the normal charging mode. Thus, the operational life of the battery 201 may be extended, as discussed above. In certain embodiments, the predetermined level or percentage of the maximum charge capacity may be set or manipulated by a user of the vehicle, for example, by interfacing with a display screen of the vehicle. Moreover, in certain embodiments, the charge mode (e.g., normal charging mode or extended charging mode) may be set or established according to default vehicle settings or according to user-defined parameters in order to automatically operate in a desired charging mode (e.g., depending upon time of the day, day of the week, etc.).

Similar to the display screen 210, as the battery 201 charges, the display screen 260 subsequently lights up elements 263 on an indicator bar 262. The indicator bar 262 may be similar to the indicator bar 212. For example, the indicator bar 262 may have a total of 10 possible elements 263, but each element 263 corresponding to 8% of battery charge for a threshold of for example 80% of the maximum charge capacity. Thus, when the battery 201 has charged the first portion 252 of the battery 201, all 10 elements 263 are illuminated on the indicator bar 262 even though the battery 201 is only charged to 80% of the maximum charge capacity. It is therefore hidden from the user looking at the indicator bar 262 on the display screen 260 that the battery has been prevented from reaching its maximum charge state, preventing confusion on the user's behalf. The display screen 260 also includes a user-interface element 264, similar to the user-interface element 214, for allowing the user to switch to the extended charging mode as described in FIG. 2A.

Figure 3:
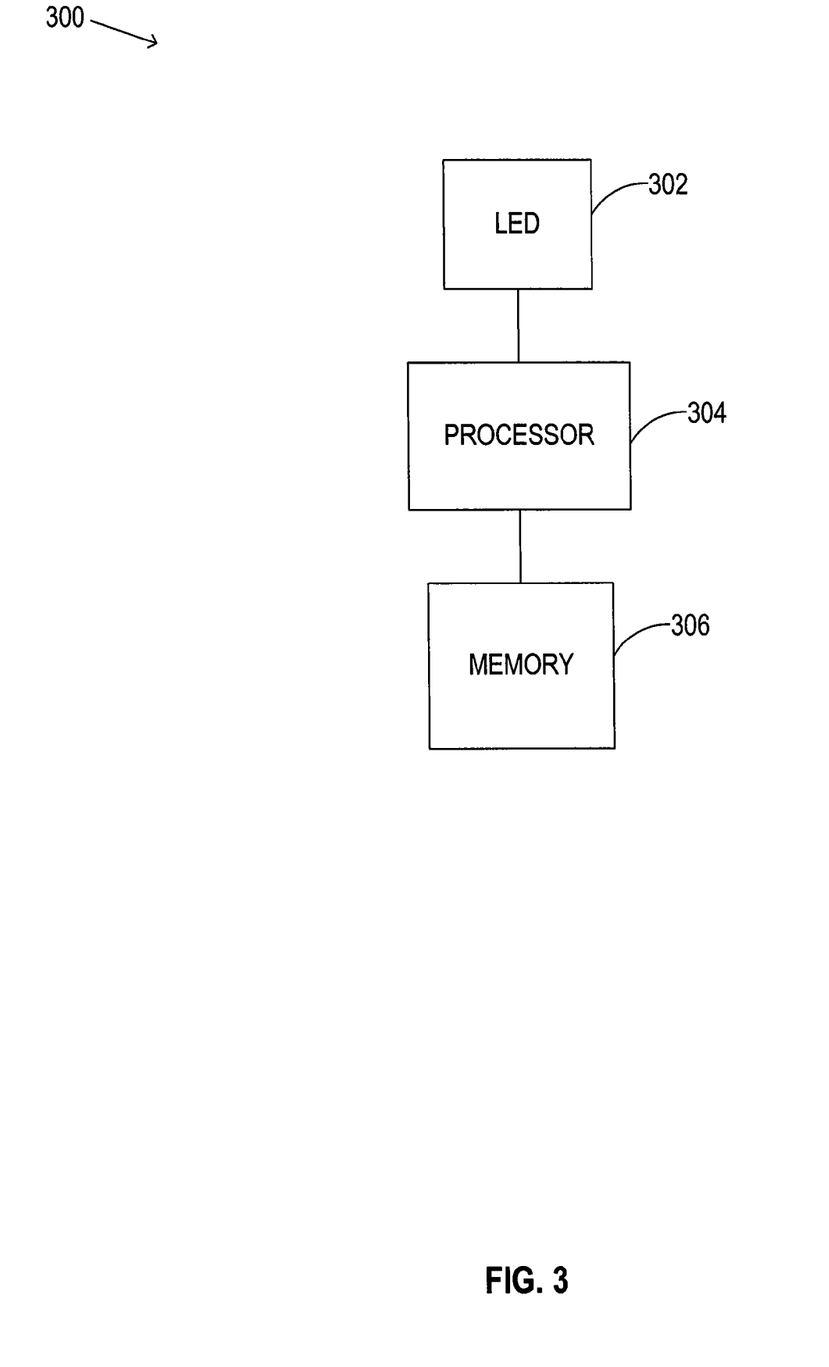
FIG. 3 is a block diagram for a battery charging indication system according to an embodiment of the present invention.

In one embodiment, instead of an indicator bar (212, 262) of a display screen (210, 260), battery charging or state of charge information may be provided via a single LED or light coupled with a dash or other interior surface of a vehicle. For example, as demonstrated in FIG. 3, a charging notification system 300 may include an LED 302 connected with a processor 304. The processor 304 may be connected with a memory 306 for storing algorithms or thresholds for illuminating the LED 302, as discussed in greater detail herein. Instead of utilizing multiple indicator elements for notifying a user of the state of battery charge for a vehicle, the LED 302 may blink or flash at varying frequencies depending upon the state of battery charge. For example, when the battery is low on charge (e.g., 10%), the LED 302 is controlled by the processor 304 to blink at a reduced rate or frequency (e.g., 10 times per minute) to indicate that the battery charge is low.

As the battery increases in charge during charging, the LED 302 is controlled by the processor 304 to blink at increasingly rapid rates or frequencies (e.g., the LED 302 may blink 90 or 9 times per minute when the battery is at 90% charge). When the battery charge is full, the LED 302 may be controlled by the processor 304 to remain in a constant on illuminated state, without any blinking, or may be controlled to turn off. Any number of thresholds may be stored in the memory 306 for varying the frequency of the LED 302. For example, 10 thresholds may be used for 10% increments of battery charge. An alternative embodiment may use components different from an LED (e.g., a speaker producing an audible beep or sound). Moreover, an alternative embodiment may vary other aspects of the LED 302 besides frequency of illumination (e.g., the LED 302 color may change depending upon the charge level or state). A red light may indicate a weak charge, a yellow light may indicate a moderate charge, and a green light may indicate a full charge. The charging notification system 300 may be used as part of the charge notice system 100, previously described for FIG. 1, the charge mode system 200, previously described for FIGS. 2A-2B, or an alternative or stand-alone charge notifying system.

The charge notice system 100, the charge mode system 200, and/or the charge notification system 300 may incorporate features from one another. In an alternative embodiment, certain features may be removed or added to the embodiments described above. For example, charging of a battery of a vehicle may be automatically delayed by a processor of the vehicle after the battery is electrically connected with a charging location until a specific time of day, such as later in the evening or night when electricity rates in a given geographic area of the vehicle are lower. Such charging may be delayed differently for different days of the week (e.g., weekends vs. weekdays). In another example, the charge mode of a vehicle may be set automatically and without user input based on a variety of parameters (e.g., stored default values, time of day dependent, day of week dependent, etc.).

Figure 4:
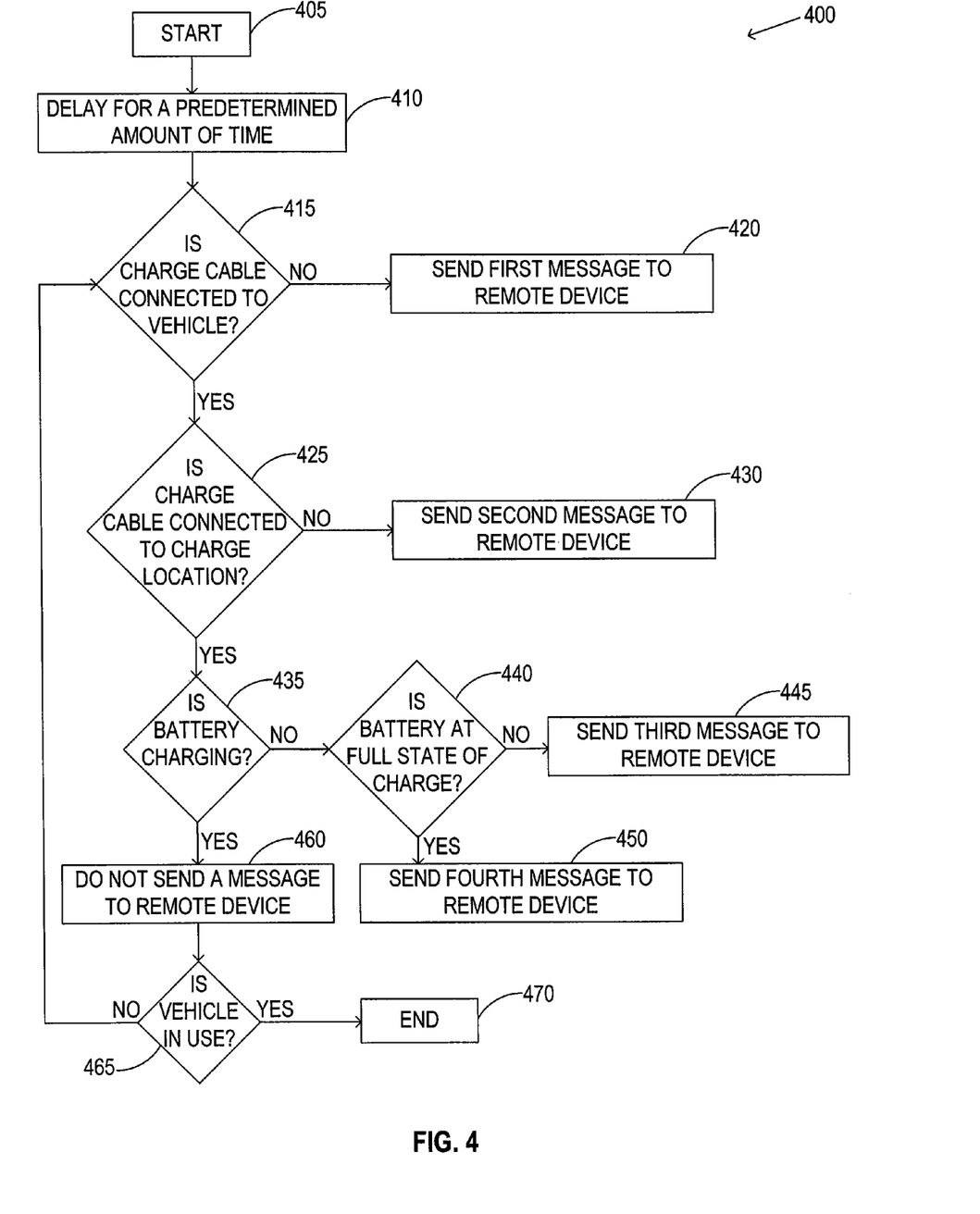
FIG. 4 is a flowchart of a remote notification charging system for a vehicle utilizing predetermined messages based upon characteristics of the vehicle according to an embodiment of the present invention.

FIG. 4 shows a flowchart of a remote notification charging system 400 for a vehicle and utilizing notification messages based upon charging characteristics of the vehicle. The remote notification charging system 400 may incorporate certain of the same or similar functional and/or structural features as previously described for FIGS. 1-3. For example, one or more of the process steps shown in the flowchart of the remote notification charging system 400 may be performed by a processor of the vehicle. At step 405, the process starts, for example, when a user of the vehicle turns off an engine of the vehicle, removes a key from an ignition slot or removes a key fob from a designated area or radius of the vehicle, such as an interior cabin compartment of the vehicle. The process next continues to step 410 where the processor of the remote notification charging system 400 creates or initiates a delay for a predetermined amount of time (e.g., a default time of 10 minutes) in order to avoid sending nuisance notifications to the user before the user has had a chance to properly configure the vehicle for charging. In one embodiment, the predetermined amount of time may be modifiable by the user via interfacing with the remote charging notification system 400.

At step 415, the processor of the vehicle determines whether a charge cable is properly connected to a portion or component of the vehicle in order to transmit or propagate power signals to the vehicle for recharging of the battery of the vehicle. This determination may be made via mechanical and/or electrical sensing (e.g., is a particular mechanical latch compressed or configured as it should be during accurate coupling of the charge cable with the portion of the vehicle). If the processor determines that the charge cable is not properly connected, operation continues to step 420. At step 420, the processor generates a first message for subsequent sending or transmittal to a remote device. The first message may be transmitted by an antenna electrically coupled with the processor and configured to receive and wirelessly propagate the first message to an external receiver of the remote device. The first message may include information about the specific error encountered during charging (e.g., that no charge cable was connected to the portion of the vehicle or that the charge cable was improperly connected to the portion of the vehicle).

However, if the processor determines that the charge cable is properly connected with the portion of the vehicle, operation continues to step 425. At step 425, the processor of the vehicle determines if the charge cable is properly connected to a charge location for providing the electrical power to the vehicle via the charge cable. This determination may be made via mechanical and/or electrical sensing (e.g., is an appropriate power signal being propagated to the portion of the vehicle via the charge cable). If the processor determines that the charge cable is not properly connected to the charge location (e.g., due to a lack of power being transmitted to the vehicle), operation continues to step 430. At step 430, the processor generates a second message, different from the first message, for subsequent sending or transmittal to the remote device, similar to the first message. The second message may thus be transmitted by the antenna electrically coupled with the processor and configured to receive and wirelessly propagate the second message to the external receiver of the remote device. The second message may include information about the specific error encountered during charging (e.g., that an improper power signal or no power signal is being received via the portion of the vehicle connected to the charge cable).

If the processor determines that the charge cable is properly connected with the charge location, operation continues to step 435. At step 435, the processor determines whether the battery of the vehicle is charging due to the provision of power via the charge cable. If the battery is not charging, then operation continues to step 440. At step 440, the processor determines whether the battery is at a full or maximum state of charge. In certain embodiments, the battery need not be at an absolute full state of charge, but rather, the processor may determine if the charge level of the battery is above a predetermined threshold. If the battery is not at the full state of charge, then operation continues to step 445. At step 445, the processor generates a third message, different from the first or the second messages, for subsequent sending or transmittal to the remote device, similar to the first or the second messages. The third message may thus be transmitted by the antenna electrically coupled with the processor and configured to receive and wirelessly propagate the third message to the external receiver of the remote device. The third message may include information about the specific error encountered during charging (e.g., that the battery of the vehicle is not at a full state of charge and is not charging properly despite an appropriate connection of the charge cable to both the vehicle and the charge location).

If the battery is instead at the full state of charge, then operation continues to step 450. At step 450, the processor generates a fourth message, different from the first, the second or the third messages, for subsequent sending or transmittal to the remote device, similar to the first, the second or the third messages. The fourth message may thus be transmitted by the antenna electrically coupled with the processor and configured to receive and wirelessly propagate the fourth message to the external receiver of the remote device. The fourth message may include information about charging characteristics of the vehicle (e.g., that the battery of the vehicle has reached a full state of charge and is no longer charging via the charge cable connected to both the vehicle and the charge location). Thus, the remote notification charging system 400 may alert the user when charging has completed for the vehicle, indicating that the vehicle is ready to travel for its maximum distance based upon the battery capability.

If instead, the processor of the vehicle determines that the battery of the vehicle is charging properly (see step 435), then operation continues to step 460 where no message is generated by the processor or sent to the remote device. At step 465, the processor determines if the vehicle has been turned on or otherwise changed or manipulated to indicate a state of use (e.g., opening a car door, inserting a key into an ignition switch, etc.). If the processor determines that the vehicle is in use, then operation continues to step 470 where the process for notifying or alerting the user of the vehicle of its charging characteristic ends. However, if the processor determines that the vehicle is not in use, operation then continues back to step 415 where certain steps previously described may be repeated. In this manner, the remote notification charging system 400 may repeatedly monitor the charging characteristics of the vehicle to ensure the vehicle properly charges or continues charging without requiring the user to be in close proximity to the vehicle to keep watch on the progress.

In an alternative embodiment, additional or replacement steps may be included as part of the remote notification charging system 400. For example, messages may be generated by the processor and transmitted to the remote device for predetermined charge levels of the battery in order to alert the user as to the charge status of the battery. In another example, the processor of the vehicle may be configured to receive signals generated by the remote device or otherwise initiated by the user. In this manner, the remote notification charging system 400 may be capable of two-way communication wherein the user can communicate and issues commands to the processor of the vehicle for controlling certain aspects or components of the vehicle. The messages generated and transmitted may be predetermined messages stored in a memory and selected by the processor or may be messages created in real-time by the processor based upon inputs received at the processor.

Figure 5:
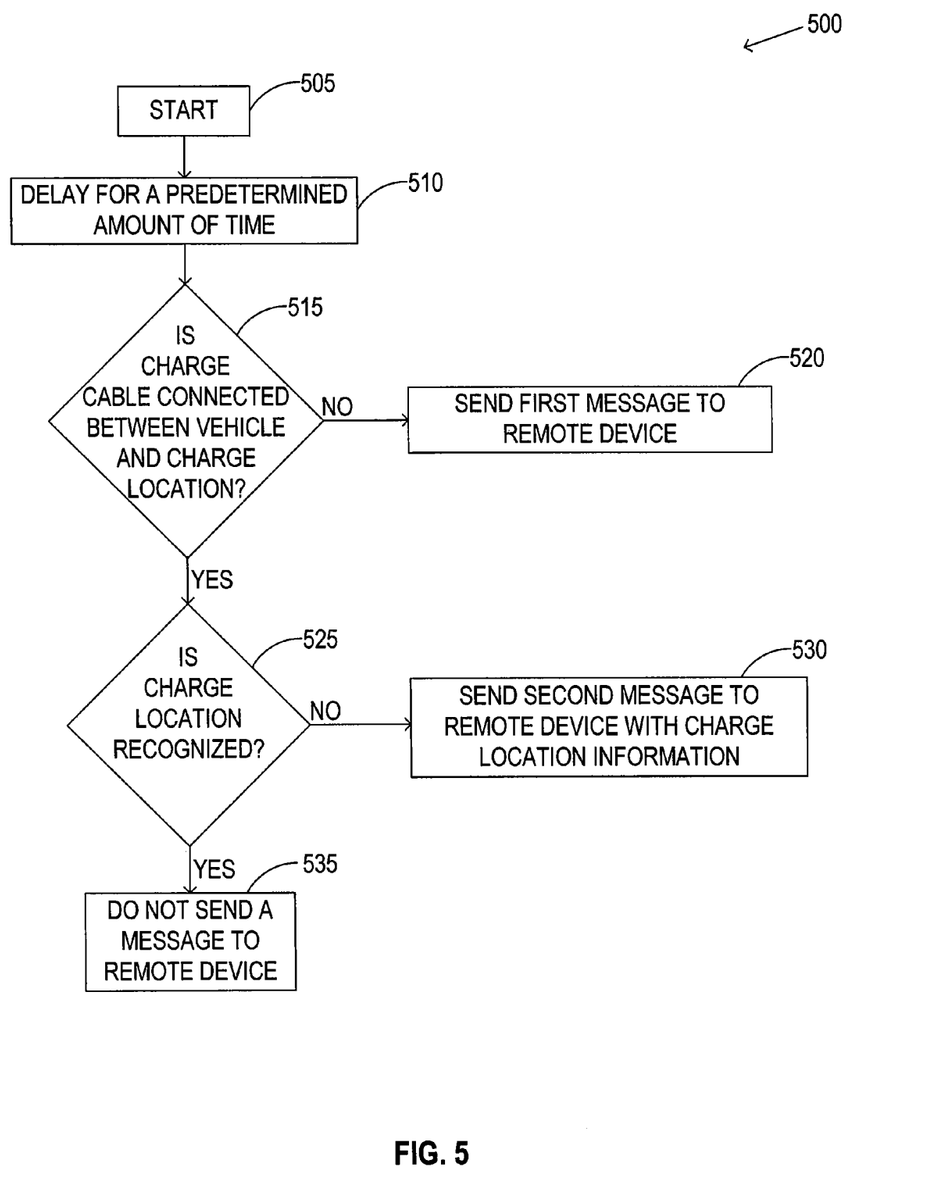
FIG. 5 is a flowchart of a remote notification charging system for a vehicle utilizing recognized charging locations according to an embodiment of the present invention.

FIG. 5 is a flowchart of a remote notification charging system 500 for a vehicle and utilizing information about unrecognized charging locations for the vehicle. The remote notification charging system 500 may incorporate certain of the same or similar functional and/or structural features as previously described for FIGS. 1-4. For example, one or more of the process steps shown in the flowchart of the remote notification charging system 500 may be performed by a processor of the vehicle. At step 505, the process starts, for example, when a user of the vehicle turns off an engine of the vehicle, removes a key from an ignition slot or removes a key fob from a designated area or radius of the vehicle, such as an interior cabin compartment. The process next continues to step 510 where the processor of the remote notification charging system 500 creates or initiates a delay for a predetermined amount of time (e.g., a default time of 10 minutes) in order to avoid sending nuisance notifications to the user before the user has had a chance to properly configure the vehicle for charging. In one embodiment, the predetermined amount of time may be modifiable by the user via interfacing with the remote charging notification system 500.

At step 515, the processor of the vehicle determines whether a charge cable is properly connected between a portion or connector of the vehicle and a charge location for providing power to the vehicle via the charge cable. If the processor determines that no proper connection exists, operation continues to step 520. At step 520, the processor generates a first message for subsequent sending or transmittal to a remote device. The first message may be transmitted by an antenna electrically coupled with the processor and configured to receive and wirelessly propagate the first message to an external receiver of the remote device. The first message may include information about the specific error encountered during charging (e.g., that no charge cable was connected between the portion of the vehicle and the charge location, that the charge cable was improperly connected to either the portion of the vehicle or the charge location or that an inadequate or non-existing power signal was propagated to the portion of the vehicle from the charge location via the charge cable).

However, if the processor determines that the charge cable is properly connected between the portion of the vehicle and the charge location, operation continues to step 525. At step 525, the processor of the vehicle determines if the charge location is recognized by the remote notification charging system 500. This recognition may be made by comparing geographic information or coordinates (e.g., utilizing GPS components) to information or known coordinates stored in a memory of the remote notification charging system 500 and connected with the processor. If the processor determines that the charge location is not a recognized or previously stored charge location, operation continues to step 530. At step 530, the processor generates a second message, different from the first message, for subsequent sending or transmittal to the remote device, similar to the first message. The second message may thus be transmitted by the antenna electrically coupled with the processor and configured to receive and wirelessly propagate the second message to the external receiver of the remote device. The second message includes information about the charge location and states that the vehicle is being charged at an unrecognized area (e.g., the second message may include information about the charge location such as a city, state, charge location ID number or name, geographic coordinates, geographic radius, etc.).

If the processor determines that the charge location is a recognized or previously stored charge location, then operation continues to step 535 where no message is generated by the processor or sent to the remote device. The messages generated and transmitted as described above may be predetermined messages stored in a memory and selected by the processor or may be messages created on the fly by the processor based upon inputs received at the processor. In certain embodiments, the user of the vehicle may be permitted to save or otherwise manipulate charge locations stored in the memory of the remote notification charging system 500 in order to specify desired charge locations to be considered recognized. In an alternative embodiment, additional or replacement steps may be included as part of the remote notification charging system 500. For example, the processor may be configured to generate additional messages or signals for transmittal to additional locations (e.g., to law enforcement or other services if the remote notification charging system 500 determines that the vehicle has been stolen). In another example, the remote notification charging system 500 may repeat certain steps if the vehicle is not in use, the same as or similar to the previous discussion for FIG. 4.

An alternative embodiment of a charge notification system may utilize alternative process steps in addition to or in replacement of the process steps specifically outlined in the above embodiments (e.g., FIG. 4 or 5). An alternative embodiment may utilize greater or fewer process steps or with alternative ordering than as previously discussed. Moreover, an alternative embodiment may have varying operational functionality and/or utilize additional, alternative or fewer devices or systems for charging the vehicle or notifying a user of the vehicle as to the charging characteristics.

Those of ordinary skill will appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various features or logical steps for a charge notice system, a charge mode system, a charge notification system or a remote notification charging system described in connection with the examples disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A charging notification system for use in a vehicle comprising:
    a battery;
    a conductor coupled with the battery and configured to receive power for charging the battery when the conductor is electrically connected with a charging cable;
    a processor coupled with the battery and configured to generate a signal if the battery is not charging when the conductor is electrically connected with the charging cable; and
    an antenna coupled with the processor and configured to wirelessly transmit the signal to a remote device.

2. The system of claim 1 wherein the signal wirelessly transmitted from the antenna is a short message service (SMS) message for transmittal to a phone using a cellular network.

3. The system of claim 1 wherein the signal wirelessly transmitted from the antenna is an email message.

4. The system of claim 1 further comprising a memory coupled with the processor and wherein the processor is configured to generate a second signal if the battery is charging via the charging cable from a charging location not recognized in the memory.

5. The system of claim 1 further comprising an engine coupled with the processor and wherein the processor is configured to delay the generating of the signal by a delay time after the engine is turned off.

6. The system of claim 5 wherein the delay time is substantially 10 minutes.

7. The system of claim 1 wherein the processor is configured to delay charging of the battery until a predetermined time of day based on a price of electricity.

8. The system of claim 1 further comprising an LED electrically connected with the processor and configured to flash at a first frequency corresponding to a first level of charge of the battery and a second frequency corresponding to a second level of charge of the battery.

9. The system of claim 1 further comprising a user-input element electrically connected with the processor for selecting a normal charge mode or an extended charge mode, the extended charge mode configured to allow charging of the battery up to a first threshold and the normal charge mode configured to allow charging of the battery up to a second threshold less than the first threshold.

10. The system of claim 9 wherein the first threshold is a maximum charge capacity of the battery of the vehicle and the second threshold is substantially 80% of the maximum charge capacity of the battery of the vehicle.

11. A method for notifying a user of a vehicle, via a processor of the vehicle, of a charging characteristic of the vehicle, the method comprising the following steps:
    delaying, using the processor, for a predetermined amount of time;
    determining, using the processor, whether a charging cable is electrically connected to the vehicle;
    generating, using the processor, a first message if the charging cable is not electrically connected to the vehicle;
    determining, using the processor, whether the charging cable is electrically connected to a charge location for receiving power from the charge location;
    generating, using the processor, a second message if the charging cable is electrically connected to the vehicle but is not electrically connected to the charge location;
    determining, using the processor, whether a battery of the vehicle is charging; and
    generating, using the processor, a third message if the charging cable is electrically connected to the vehicle and to the charge location but the battery of the vehicle is not charging.

12. The method of claim 11 further comprising the following steps:
    determining, using the processor, whether the battery of the vehicle has a state of charge above a predetermined threshold; and
    generating, using the processor, a fourth message if the charging cable is electrically connected to the vehicle and to the charge location, the battery of the vehicle is not charging and the battery of the vehicle has a state of charge above the predetermined threshold.

13. The method of claim 12 further comprising a step of wirelessly transmitting the first message, the second message, the third message or the fourth message, using an antenna electrically connected with the processor, to a remote device.

14. The method of claim 13 wherein the first message, the second message, the third message or the fourth message is chosen from a group consisting of a text message, an email message and a voice recording.

15. The method of claim 13 wherein the remote device is a cellular phone.

16. A method for notifying a user of a vehicle, via a processor of the vehicle, of a charging characteristic of the vehicle, the method comprising the following steps:
    waiting, using the processor, for a predetermined period of time;
    determining, using the processor, whether a charging cable is electrically conductive between a battery of the vehicle and a charge location;

sending, using the processor, a first message to a remote device if the charging cable is not electrically conductive between the battery of the vehicle and the charge location;

determining, using the processor, whether the charge location is a recognized location in a memory electrically connected with the processor; and sending, using the processor, a second message to the remote device if the charge location is not a recognized location.

17. The method of claim 16 wherein the second message to the remote device includes location information corresponding to the charge location.

18. The method of claim 17 wherein the location information corresponding to the charge location is a coordinate based on a geographic positioning system electrically connected with the processor.

19. The method of claim 17 further comprising the following steps:

receiving a signal at the processor from the remote device; and disabling operation of an engine of the vehicle based on reception of the signal at the processor.

20. The method of claim 16 wherein the sending of the first message or the second message to the remote device includes wirelessly transmitting a message with text via a cellular network.

* * * * *